United States Patent [19]

Sago et al.

[11] Patent Number: 4,912,506
[45] Date of Patent: Mar. 27, 1990

[54] IMAGE RECORDING APPARATUS HAVING EXPOSURE UNIT

[75] Inventors: Akira Sago; Masashi Ueda; Osamu Takagi, all of Nagoya; Yumio Matsumoto, Kasugai; Kiyoharu Hayakawa, Aichi, all of Japan

[73] Assignee: Brother Kogyo Kabushiki Kaisha, Japan

[21] Appl. No.: 203,105

[22] Filed: Jun. 7, 1988

[30] Foreign Application Priority Data

Jun. 10, 1987 [JP] Japan ................................. 62-89134
Dec. 15, 1987 [JP] Japan .......................... 62-191012[U]

[51] Int. Cl.$^4$ ............................................. G03B 27/04
[52] U.S. Cl. .................................................... 355/113
[58] Field of Search ................................... 355/27-29, 355/78, 84, 99, 113

[56] References Cited

U.S. PATENT DOCUMENTS 2,784,653 3/1957 Pierce et al. .......................... 355/27
2,855,834 10/1958 Doster .................................... 355/29
3,627,416 12/1971 Benson ............................. 355/113 X Primary Examiner—Donald A. Griffin
Attorney, Agent, or Firm—Oliff & Berridge

[57] ABSTRACT

An exposure unit for exposing a photosensitive image recording medium with light for forming an image corresponding to an original. The exposure unit comprises a light source; an original mounting table for mounting the original thereon, the original mounting table being disposed above the light source and extending over a light path zone so as to maintain the original at the light path zone, the photosensitive image recording medium being travelled over the original; contact means disposed above the photosensitive image recording medium for providing an intimate contact between the original and the photosensitive image recording medium when the original is brought into the light path zone for allowing a light to pass through the original and to reach to the photosensitive image recording medium; and, means for guiding travel of one of the original and the photosensitive image recording medium.

3 Claims, 10 Drawing Sheets

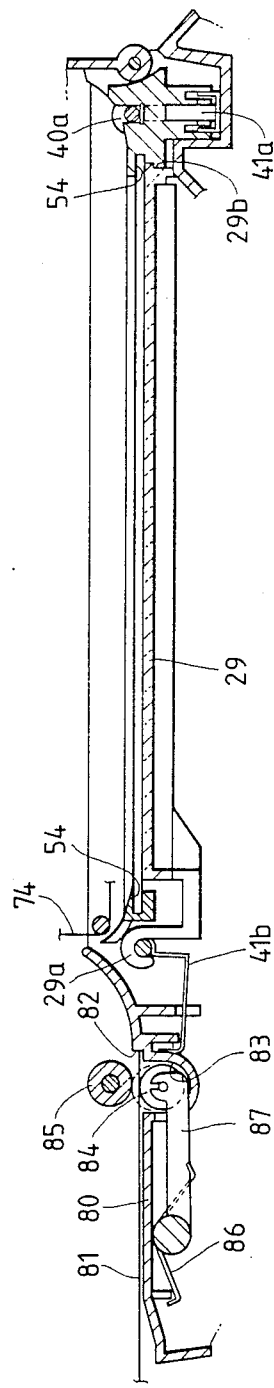

IMAGE RECORDING APPARATUS HAVING EXPOSURE UNIT

BACKGROUND OF THE INVENTION

The present invention relates to an image recording apparatus, and more particularly, to an exposure unit of the image recording apparatus eliminating mechanical interference between a photosensitive pressure sensitive recording medium and an original or an original supporting member.

In the image recording apparatus, two types of image recording mediums are used, one is a self-contained type recording medium and the other is a transfer type recording medium. In the self-contained type recording medium, an encapsulated chromogenic material or dye precursor and a developer material are co-deposited on one surface of a single substrate as one layer or as two contiguous layers as disclosed in U.S. Pat. No. 4,440,846. In the transfer type recording medium, the developer material is coated on a separate substrate as a separate developer or copy sheet as described in U.S. Pat. No. 4,399,209.

Generally, the recording medium is subjected to light exposure for forming a latent image thereon corresponding to an original at an exposure unit, so that the light-exposed microcapsules are photo-cured, and in the subsequent pressure application at a pressure developing unit, non-photocured microcapsules are ruptured to react with the developer material to provide a visible image on the recording medium (self-contained type) or on the separate developer sheet (in the transfer-type).

In the light exposure unit, the original is brought into close contact with the photosensitive recording meidum. In this case, if the recording medium has sufficient hardness such as diazo photosensitive medium, the latter would not be easily injured, and therefore, it is unnecessary to protect the photosensitive surface of the recording medium. On the other hand, if a photosensitive recording medium having low hardness is applied, the recording medium may be disadvantageously formed with a scar due to frictional contact with the original. In this connection, conventional rollers for providing a superposition between the original and the recording medium may not be available for such low hardness recording medium.

In several cases, the original is protected by being sandwiched by an original supporting sheet member, and the original supporting member mounting the original is inserted into the image recording apparatus and is positioned onto an exposure table at which the recording meidum is brought into intimate contact with the original supporting member for light exposure. In this respect, according to a conventional image recording apparatus, the exposure table is positioned lower than that of the ambient mechanical components. However, such low positional setting of the exposure table may provide a stepped portion, so that it would be rather difficult to automatically install a new rolled image recording medium onto the recording apparatus, and particularly, it would be difficult to permit the reading end of the medium to pass through the exposure unit and to direct the same toward the pressure developing unit due to undesirable guiding by the stepped portion.

SUMMARY OF THE INVENTION

It is an object of the present invention to overcome the above described drawbacks and disadvantages, and to provide an improved exposure unit in an image recording apparatus.

Another object of the present invention is to provide such exposure unit capable of preventing an original or original supporting member from damaging a surface of a photosensitive recording medium when the original or original supporting member is inserted into the image recording apparatus.

Still another object of the invention is to provide such exposure unit which facilitates smooth travel of the photosensitive recording medium at the exposure unit.

According to the present invention, there is provided an exposure unit for exposing a photosensitive image recording medium with light for forming an image corresponding to an original comprising, a light source, an original mounting table, contact means, and means for guiding travel of one of the original and the photosensitive image recording medium. The original mounting table is adapted for mounting the original thereon, and is disposed above the light source and extends over a light path zone so as to maintain the original at the light path zone. The photosensitive image recording medium is travels over the original. The contact means is disposed above the photosensitive image recording medium for providing an intimate contact between the original and the photosensitive image recording medium when the original is brought into the light path zone for allowing a light to pass through the original and to reach to the photosensitive image recording medium. The means for guiding is adapted to guide travel of the original or the leading end of the photosensitive recording medium. In one aspect of the present invention, the photosensitive recording medium is kept unharmed because of the non frictional contact with the original, since the original is inserted onto the original mounting table by the guidance of the guiding means. In another aspect of the invention, the leading edge of the photosensitive image recording medium is stably directed toward a pressure developing unit because of the guiding means.

BRIEF DESCRIPTION OF THE DRAWINGS

In the drawings:

FIG. 12 is a cross-sectional view taken along line XII—XII of FIG. 7.

DESCRIPTION OF THE PREFERRED EMBODIMENT

The following embodiments concern transfer type image recording method as disclosed in U.S. Pat. No. 4,399,209 for color image recording using a photosensitive pressure sensitive sheet and a developer sheet. However, if other types of photosensitive sheet are intented to be used, an exposure unit in the foregoing embodiments can be used as they are without any modification thereto except for the modification to an image fixing unit. For example, the self-contained type image recording method is also applicable by modifications to mechanical components other than the exposure unit.

A first embodiment of the invention will be described with reference to FIGS. 1 thru 3. The first embodiment particularly concerns guide means for guiding travel of an original or original supporting member which accommodates therein the original.

Figure 1:
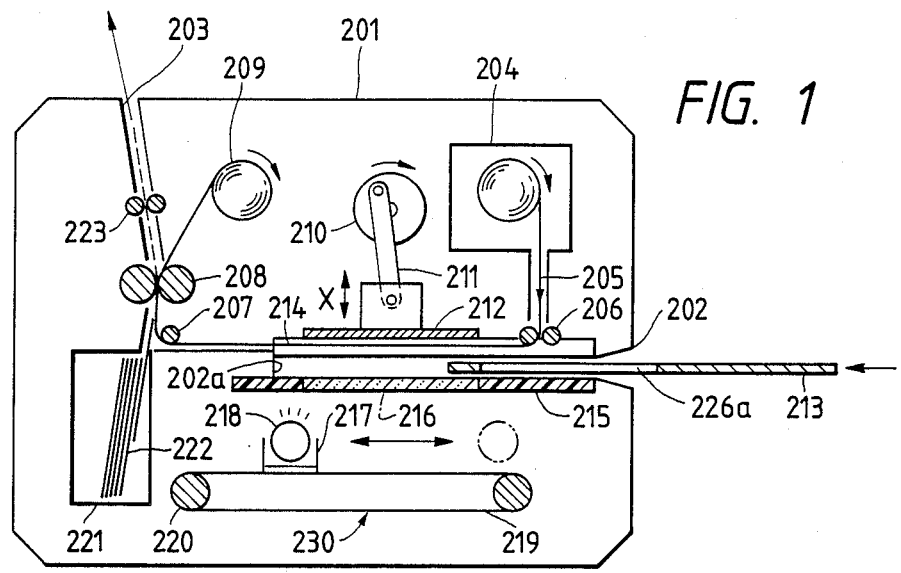
FIG. 1 is a schematic vertical cross-sectional view showing an image recording apparatus and particularly showing an exposure unit having an orignal insertion poriton according to a first embodiment of the present invention.

An image recording apparatus as shown in FIG. 1 according to the first embodiment has a lower portion provided with an exposure unit 230, and has one end portion (right side in FIG. 1) formed with an original insertion hole 202. Further, a developer sheet discharge outlet 203 is formed at an upper portion of the apparatus. At the upper right portion within the apparatus, a photosensitive sheet roll cassette 204 is provided in which a photosensitive pressure sensitive sheet roll 205 is light-shieldingly accommodated. Below the cassette 204, a drive roller 206 is provided for drawing out of the rolled sheet 205 from the cassette 204.

Turning to a path of the photosensitive sheet 205, a feed roller 207 is provided at a downstream side of the drive roller 206, and pressure developing rollers 208 are provided above the feed roller 207. Further, a take-up roller 209 is provided at right side of and above the pressure developing rollers 208.

The exposure unit 230 is positioned between the drive roller 206 and the feed roller 207 or between the cassette 204 and the take-up roller 209. In this zone, and above the photosensitive pressure sensitive sheet 205, there is provided a contact plate 212 which is movable vertically in a direction indicated by arrow X. The contact plate 212 is connected to a gear wheel 210 driven by a motor (not shown) through a connecting rod 211.

An original mounting table 215 is provided at the exposure unit 230 and extends over a light path zone. Above the original mounting table 215, an original passage 202a extends therealong which is in communication with the original insertion hole 202. The original passage allows an original 224 or an original supporting member 213 which protectably maintains the original 224 to pass therethrough. As best shown in FIG. 2, at the original passage 202a, an original guiding means 214 is provided which extends along longitudinal edge lines of the original or original supporting member. The original guiding means 214 is adapted to guide travel of the original 224 or original supporting member 213 for preventing the same from frictionally contacting with the photosensitive sheet 206 when the original or the original supporting member 213 is inserted into the original insertion hole 202 and travelled along the passage 202a.

Figure 3:
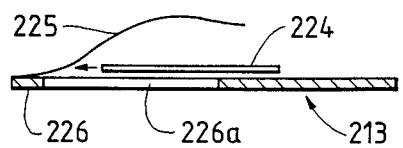
FIG. 3 is a cross-sectional view showing an original supporting sheet which mounts an original thereon.

More specifically, the original supporting member 213 includes a flexible cover member 225 for protecting a surface of the original 224 as shown in FIG. 3. The guide means 214 prevents the cover member 225 from being displaced upwardly and permits the original supporting member 213 to move leftwardly in FIG. 1.

Figure 2:
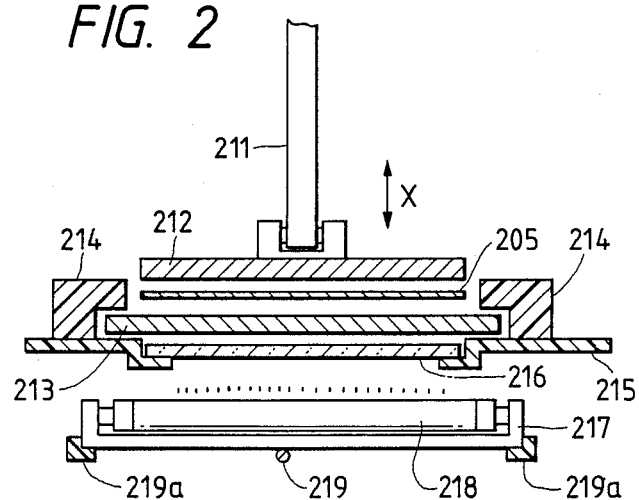
FIG. 2 is a cross-sectional view showing the original insertion portion.

As shown in FIG. 2, the original mounting table 215 is formed with an opening at which a transparent glass plate 216 is provided. Below the original mounting table 215, a light source unit 217 is provided. The unit 217 includes a fluorescent lamp 218 fixedly mounted on a rope member 219. Both ends of the lamp 218 are slidingly supported on a lamp guide 219a. The rope member 219 is trained over drive pulleys 220 conneted to a drive motor (not shown), so that the fluorescent lamp 218 is reciprocally movable along the original mounting table 215.

As shown in FIG. 1, a developer sheet cassette 221 is provided at left side of the light source unit 217, and cut developer sheets 222 are accommodated in the cassette 221. Further, a pair of feed rollers 223 are provided above the cassette 221.

FIG. 3 shows the original supporting member 213 which includes the flexible cover 225 and a base plate 226. One end of the flexible cover 225 is fixedly connected to one end of the base plate 226 so as to sandwich the original 224 therebetween. The base plate 226 is formed with a transparent portion 226a which allows light to pass therethrough. It goes without saying that the flexible cover 225 is also formed of transparent material.

Operation mode according to the first embodiment will be described. As shown in FIG. 3, the original 224 is positioned at a proper portion on the base plate 226 and is covered with the flexible cover 225. The original supporting member 213 is inserted into the original insertion hole 202 and is pushed onto the original passage 202a along the original guide means 214. In this case, the original supporting member 213 can be placed at the predetermined position of the original mounting table 215 without any frictional contact with the photosensitive pressure sensitive sheet 205 because of the proper guiding of the guide means 214.

Upon completion of the setting of the original supporting member 213, the drive gear 210 is rotated by the energization of the motor (not shown), so that the connecting rod 211 provides its descent position to lower the contact plate 212. As a result, the photosensitive pressure sensitive sheet 205 is brought into intimate contact with the transparent glass plate 216 of the original mounting table 215.

Then, the drive pulley 220 is rotated, so that the rope member 219 is moved for moving the light source 218 rightwardly in FIG. 1 along the light source guide 219a, to thereby initiate line exposure. Light from the fluorescent lamp 218 passes through the transparent glass plate 216 and the original supporting member 213, so that the photosensitive pressure sensitive sheet 205 undergoes light exposure to form a latent image thereon corresponding to an image of the original 224.

Upon completion of the light exposure, the light source 217 is returned to its original position, and at the same time, the drive gear 210 is rotated to move the contact plate 212 toward its ascent position. Accordingly, the contact plate 212 is separated from the photosensitive sheet 205. The unclamped photosensitive sheet 205 is then moved toward the pressure developing rollers 208 by way of the feed roller 207 by means of the drive roller 26 and the takeup roller 209.

At the immediate upstream side of the pressure developing rollers 208, the light-exposed portion of the photosensitive sheet 205 is superposed with the developer sheet 222 supplied from the sheet cassette 221. The superposed sheets 205 and 222 pass through the pressure developing rollers 208 under pressure, so that a visible image is provided on the developer sheet 222, which visible image corresponds to the latent image on the photosensitive sheet 205. Then, the developer sheet 222 is separated from the photosensitive sheet 205, and is discharged from the discharge outlet 203 through the feed rollers 223, while the photosensitive sheet 205 is wound over the takeup roll 209.

In the first embodiment, means for guiding travel of the original is provided at the original passage 202a at a position corresponding to longitudinal side edges of the original, so that the guide means prevents the original or original supporting member from directing toward the photosensitive pressure sensitive sheet when the original is moved to its exposure position. Therefore, the photosensitive pressure sensitive sheet does not undergo any frictional injury.

A second embodiment of the invention will next be described which particularly relates to guiding travel of a leading edge of the photosensitive recording medium such a web-like photosensitive pressure sensitive recording sheet.

Figure 4:
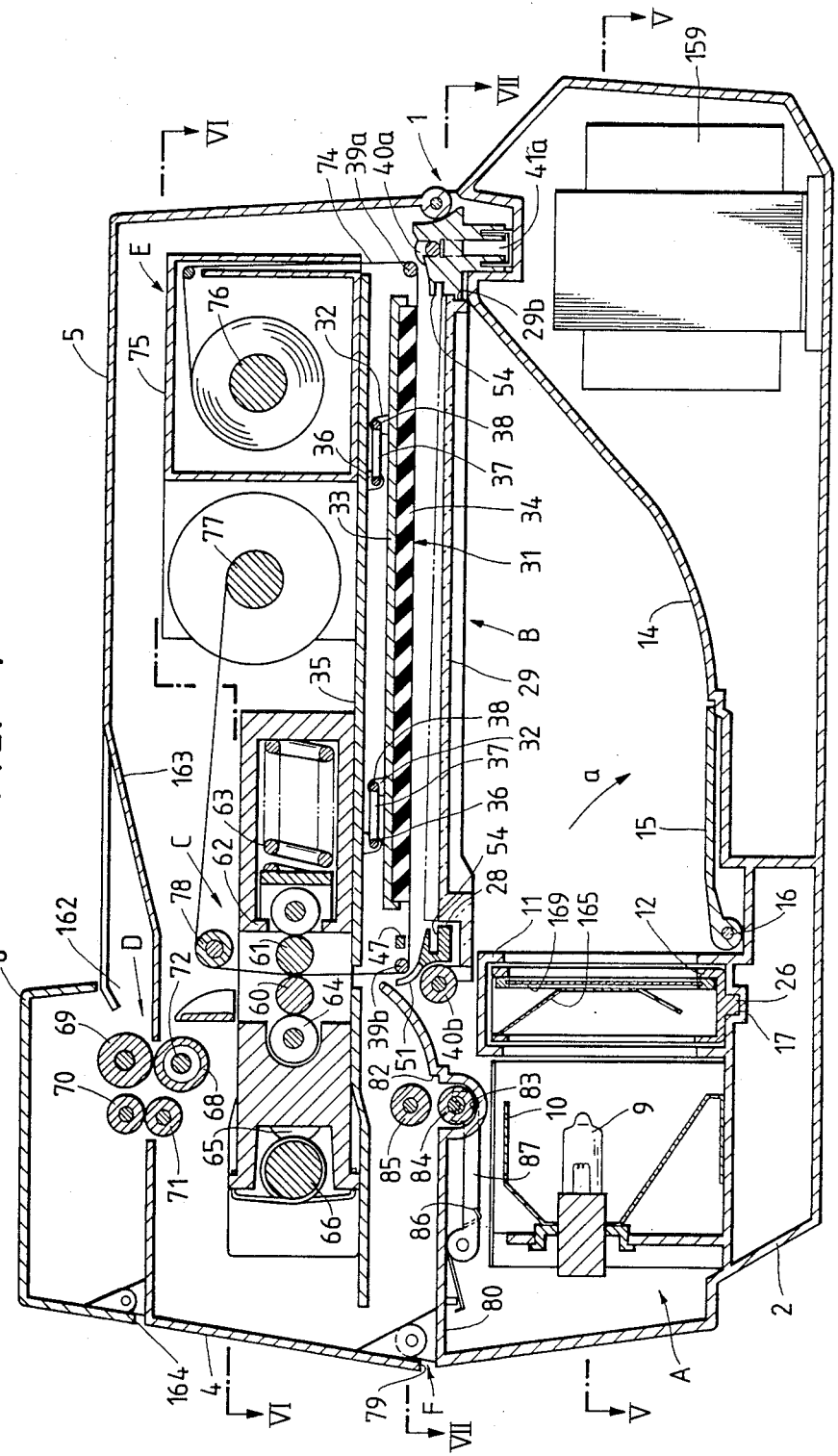
FIG. 4 is a vertical cross-sectional view showing an image recording apparatus incorporating a device for feeding a sheet according to another embodiment of this invention.
Figure 6:
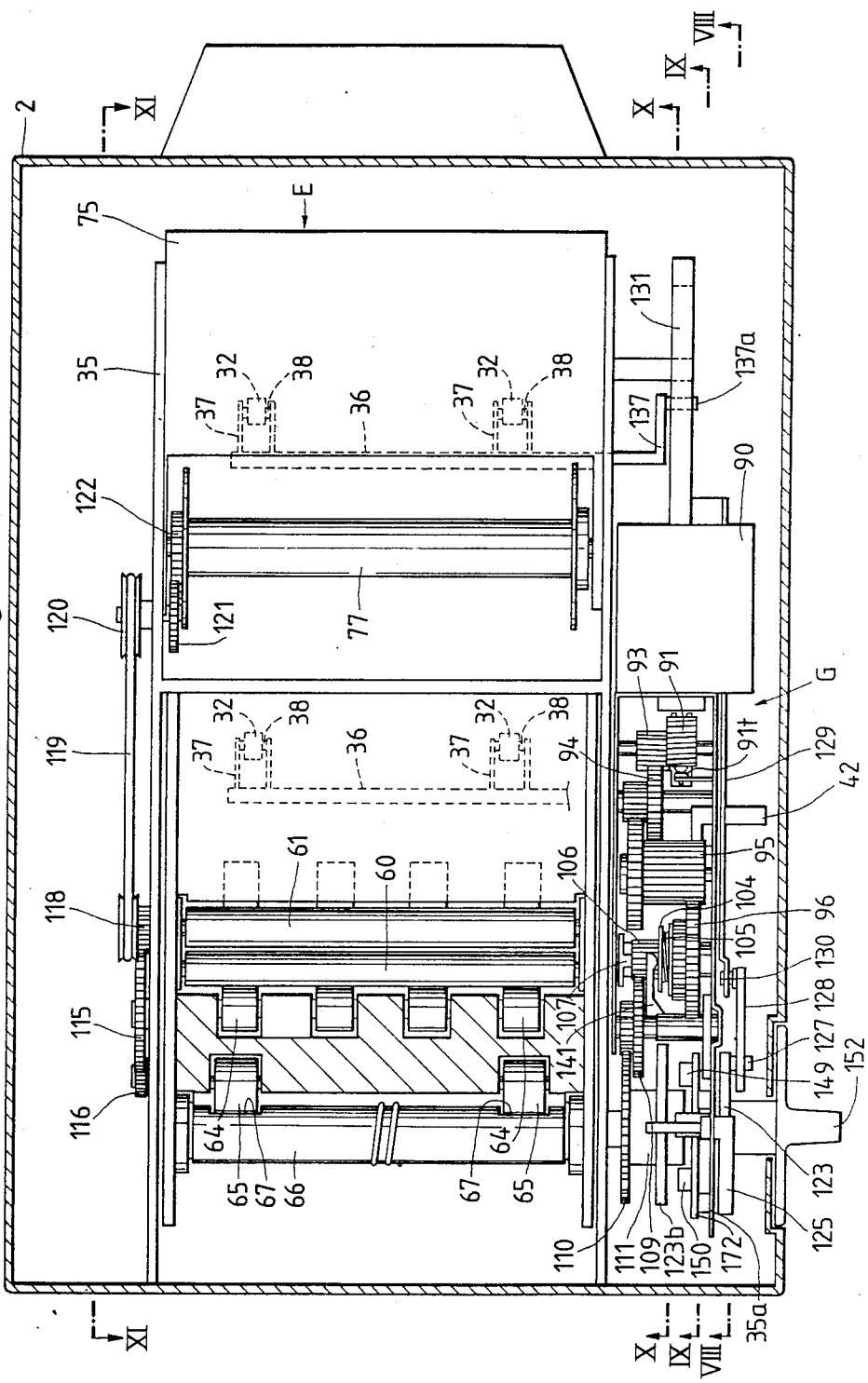
FIG. 6 is a cross-sectional view taken along line VI—VI of FIG. 4.

The second embodiment shown in FIG. 4 generally comprises an exposure light source unit A, an exposure unit B, a pressure developing unit C, a thermal fixing unit D, a sheet storage cartridge E, a developer sheet insertion unit F, and a driver unit G (FIG. 6). The image recording apparatus has a housing 1 including a lower casing 2 on which a front cover 4, a rear cover 5, and a frame 35 are openable and closable, i.e., swingably mounted. An upper cover 6 is hinged to the front cover 4 at its upper portion.

[Exposure Light Source Unit A]

Figure 5:
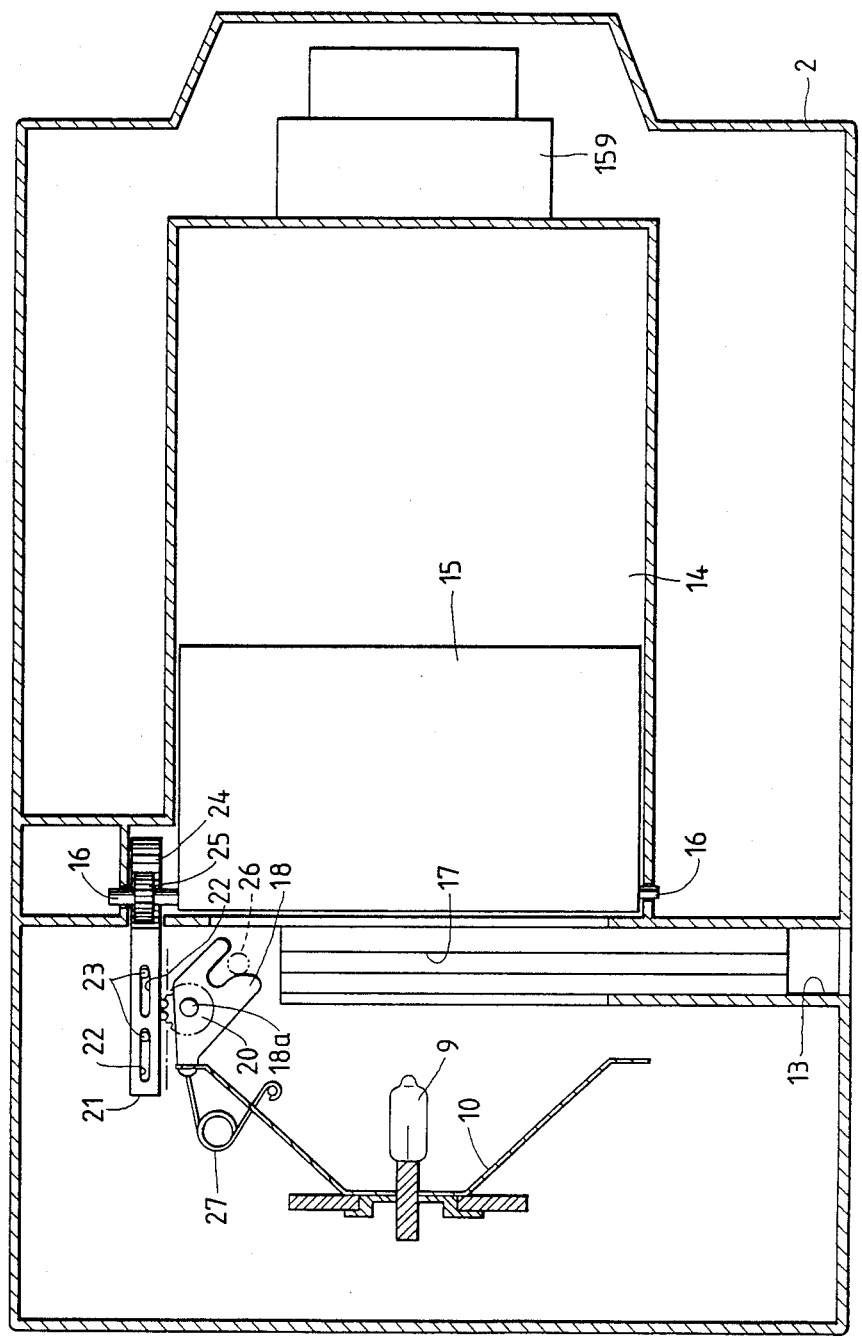
FIG. 5 is a cross-sectional view taken along line V—V of FIG. 4.

As also shown in FIG. 5, the exposure light source unit A comprises a halogen lamp 9 lying horizontally near one side panel of the casing 2, the halogen lamp 9 having its rear and side areas surrounded by a reflector 10. The exposure light source unit A also includes a filter box 11 positioned in front of the halogen lamp 9, and a curved light diffusion plate 14 disposed in front of the filter box 11. A filter case 12 with a color filter 169 mounted therein can be inserted into the filter box 11 through a filter insertion slot 13 (FIG. 5) defined in one side panel of the housing 1. A shutter plate 15 is openably and closably, i.e., swingably mounted in front of the filter box 11.

The shutter plate 15 can be opened and closed by a mechanism as shown in FIG. 5. More specifically, a shutter operating plate 18 is angularly movably mounted on a support shaft 18a on a bottom panel of the casing 2 near the inner end of a groove 17 defined in the bottom of the filter box 11. The shutter operating plate 18 has an integral gear 20 meshing with a rack bar 21 which has a pair of guide slots 22 defined therein. The rack bar 21 is longitudinally movable back and forth in a direction normal to a support shaft 16 of the shutter plate 15, while being guided by pins 23 loosely fitted in the respective slots 22. The rack bar 21 has rack teeth 24 on an upper surface remote from the guide slots 22, the rack teeth 24 meshing with a gear 29 mounted on the support shaft 16. A torsion spring 27 acts between the shutter operating plate 18 and the bottom panel of the casing 2 to click the shutter plate 15 selectively into open and closed positions. When the filter case 12 is not loaded in the filter box 11, the shutter plate 15 is in an upstanding position to close the opening of the filter box 11.

[Exposure Unit B]

The exposure unit B will be described below. As shown in FIGS. 2 and 5, the exposure unit B includes a square frame 28 holding a transparent support body 29, and a presser plate 31 spaced a small gap upwardly from the transparent support body 29. The presser plate 31 comprises an attachment base board 33 and a rubber pressure plate 34 bonded to the lower surface of the base board 33. The square frame 28 is fixed to the casing 2. The transparent support body 29 has hooks 29a (see also FIG. 12) engaging the shaft of load rollers 40b, so that the transparent support body 29 can be angularly moved vertically about bearing plates 29b on the right-hand end of the support body 29 within the square frame 28 in response to vertical movement of the load rollers 40b. The pressure plate 31 is suspended from the lower surface of the frame 35 angularly movably supported on the casing 2, by means of shafts 36 mounted on the lower surface of the frame 35, swing rods 37 mounted on the ends of the shafts 36 and having engaging pins 38 on their distal ends, and hooks 32 mounted on the upper surface of the attachment base board 33 and holding the engaging pins 38, as also shown in FIG. 6. A light-transmissive original can be inserted through original supporting member insertion slots 53 (FIG. 7) defined in the opposite side panels of the housing 1 into a position between the transparent support body 29 and the presser plate 31. The original supporting member is inserted while being guided by a guide frame 54 (FIG. 12). The function of the guide frame 54 is the same as that of the guide 214 in the first embodiment.

Figure 7:
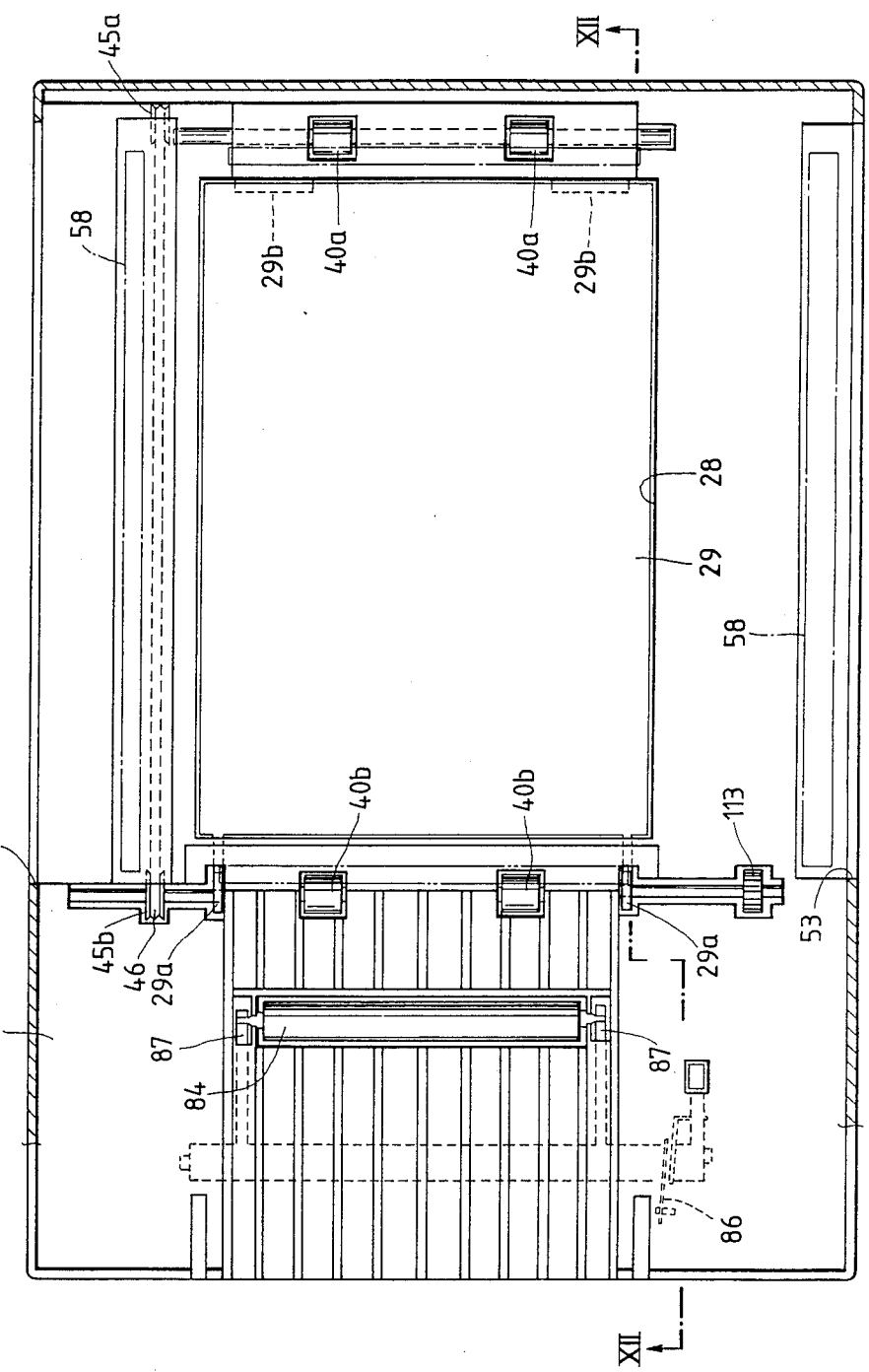
FIG. 7 is a cross-sectional view taken along line VII—VII of FIG. 4.

A photosensitive pressure-sensitive image recording sheet 74 is fed between the original table and the presser plate 31. Guide rollers 39a, 39b are positioned at inlet and outlet ends, respectively, of the exposure unit B, and load rollers 40a, 40b are also positioned at the inlet and outlet ends, respectively, of the exposure unit B. The guide roller 39a and the load rollers 40a are relatively movable toward and away from each other, and similarly the guide roller 39b and the load rollers 40b are relatively movable toward and away from each other. A load belt 46 (FIG. 7) is trained around pulleys 45a, 45b fixedly mounted on the shafts of the load rollers 40a, 40b. As illustrated in FIG. 4, the load rollers 40a, 40b are normally urged to move toward the guide rollers 39a, 39b by load roller springs 41a, 41b (see also FIG. 12. Under normal condition, the opposite end of the shaft of the load rollers 40a are held downwardly by fingers 44 (FIG. 8) projecting from a side panel of the rear cover 5 so that the rollers 40a are spaced from the guide roller 39a. Similarly, one end of the shaft of the load rollers 40b is held downwardly by a finger projecting from an upper panel of the rear cover 5, whereas the other end of the shaft of the load rollers 40b is held downwardly by a sheet feed lever 42 which is supported on a housing panel and resiliently biased by a spring 43 (FIGS. 6 and 7), so that the load rollers 40b are spaced away from the guide roller 39b under normal condition. As shown in FIGS. 5 and 7, a load gear 113 is fixedly mounted on the shaft of the load rollers 40b. The shaft of the load rollers 40b is operatively coupled to a driver source (described later on) through the load gear 113.

An exposure slit lamp tube 47 for re-exposing the photosensitive pressure-sensitive sheet is disposed at the outlet end of the exposure unit B. A guide member 51 which is also disposed at the outlet end of the exposure unit B is of an arcuate shape for guiding, toward the pressure fixing unit C, the leading end of the photosensitive pressure-sensitive sheet in the form of a roll when it is loaded into the housing 1. As illustrated in FIG. 7, light-shielding rollers 58 are disposed respectively in the original supporting member insertion slots 53 for preventing extraneous light from entering the exposure unit B. The original supporting member may be of the type shown in FIG. 3 in the first embodiment.

[Pressure Developing Unit C]

The pressure developing unit C is constructed as follows: The pressure developing unit C has a pair of confronting pressure developing rollers 60, 61 (FIGS. 2 and 4) movable toward and away from each other. The pressure developing roller 61 is resiliently pressed toward stoppers 62 against the resiliency of a spring 63 by the pressure developing roller 60. The pressure developing roller 60 is resiliently pressed against the pressure developing roller 61 by backup rollers 64, cam follower rollers 65, and a cam roller 66. The cam roller 66 has cam slots 67 defined in a peripheral surface thereof. When the cam follower rollers 65 are positioned in the respective cam slots 67, the pressure developing rollers 60, 61 are released of pressed contact with each other. When the cam roller 66 is rotated about its own axis to cause its circular peripheral surface to engage the cam follower rollers 65, the pressure developing roller 60 is pressed against the pressure developing roller 61. While the cam roller 66 makes one revolution about its own axis, the photosensitive pressure-sensitive sheet 74 is fed along by one image-wise length while being gripped between the pressure developing rollers 60, 61.

A mechanism for driving the pressure developing unit C will be described later on.

[Thermal Fixing Unit D]

As shown in FIG. 4, the thermal fixing unit D comprises a pair of thermal fixing rollers 68, 69 and a pair of discharge rollers 70, 71 disposed downstream of the thermal fixing rollers 68, 69 in the direction in which a sheet is discharged from the thermal fixing unit D. The thermal fixing roller 68 houses a roller heating heater 72, the temperature of which is controlled by a temperature signal detected by a thermistor (not shown) attached to the peripheral surface of the thermal fixing roller 68.

[Sheet Storage Cartridge Unit E]

The sheet storage cartridge E will be described below. The sheet storage cartridge E includes a sheet storage cassette 75 housing therein a supply roller 76 supporting a roll of the photosensitive pressure-sensitive sheet 74 and a takeup roller 77 for winding the photosensitive pressure-sensitive sheet 74 thereon. The sheet storage cartridge E is driven by a mechanism described later on. The photosensitive pressure-sensitive sheet 74 is fed from the supply roller 76 to the takeup roller 77 as follows: The sheet 74 that is unwound from the supply roller 76 passes between the guide roller 39a and the load roller 40a into a position between the presser plate 31 and the original table in the exposure unit B. Thereafter, the sheet 74 passes through the guide roller 39b and the load roller 40b into the pressure developing unit C where the sheet 74 is gripped between the pressure developing rollers 60, 61. Then, the sheet 74 discharged from the pressure developing unit C runs around a sheet feed roller 78 and is wound on the takeup roller 77. The amount by which the sheet 74 is fed is controlled by the sheet feed roller 78 in a manner described later on.

[Developer Sheet Insertion Unit F]

The developer sheet insertion unit F includes a developer sheet insertion slot 79 defined between the front cover 4 and the casing 2 and a sheet guide plate 80 on top of the casing 2 and beneath the developer sheet insertion slot 79. The sheet guide plate 80 has a stopper 82 at its inner portion for temporarily engaging and holding the leading end of a developer sheet 81, as shown in FIG. 12, which is inserted through the insertion slot 79, the stopper 82 being in the form of a vertical wall surface. The sheet guide plate 80 includes a curved portion disposed inwardly of the stopper 83 and directed toward the inlet side of the pressure developing rollers 60, 61. The sheet guide plate 80 has a downward cavity 83 which normally accommodates therein a feed roller 84 that is movable into and out of the cavity 83. The feed roller 84, when it is moved out of the cavity 83, can engage a pinch roller 85 disposed upwardly of the feed roller 84. The feed roller 84 is rotatably supported at its opposite ends on the distal ends of support bars 87 (see FIGS. 2 and 5) which are normally urged by a spring 86 to turn counterclockwise (FIG. 4) to move the feed roller 84 upwardly toward the pinch roller 85. The support bars 87 are usually held down by a release arm 89 (FIGS. 6 through 8) to keep the feed roller 84 away from the pinch roller 85 against the resiliency of the spring 86. The stopper 82 and the vertically movable feed roller 84 correspond to the stopper gate 221 and the solenoid 220 in the first embodiment. A mechanism for driving the feed roller 84 will be described later on.

[Driver Unit G]

The driver unit G will be described below. The driver unit G has a mechanism for driving the exposure light source unit A, the exposure unit B, the pressure developing unit C, the thermal fixing unit D, the sheet storage cartridge E, and the developer sheet insertion unit F, as described above, in a mutually interlinked fashion.

Figure 8:
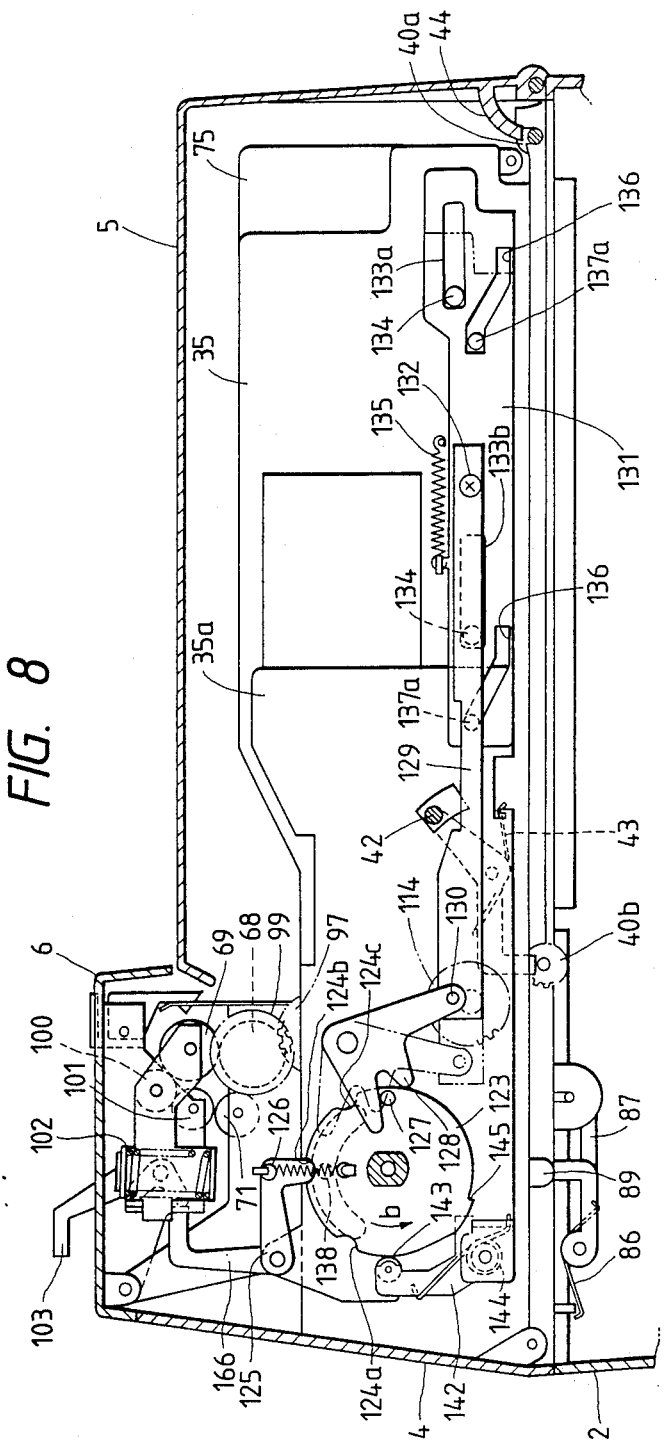
FIG. 8 is a cross-sectional view taken along line VIII—VIII of FIG. 6.
Figure 9:
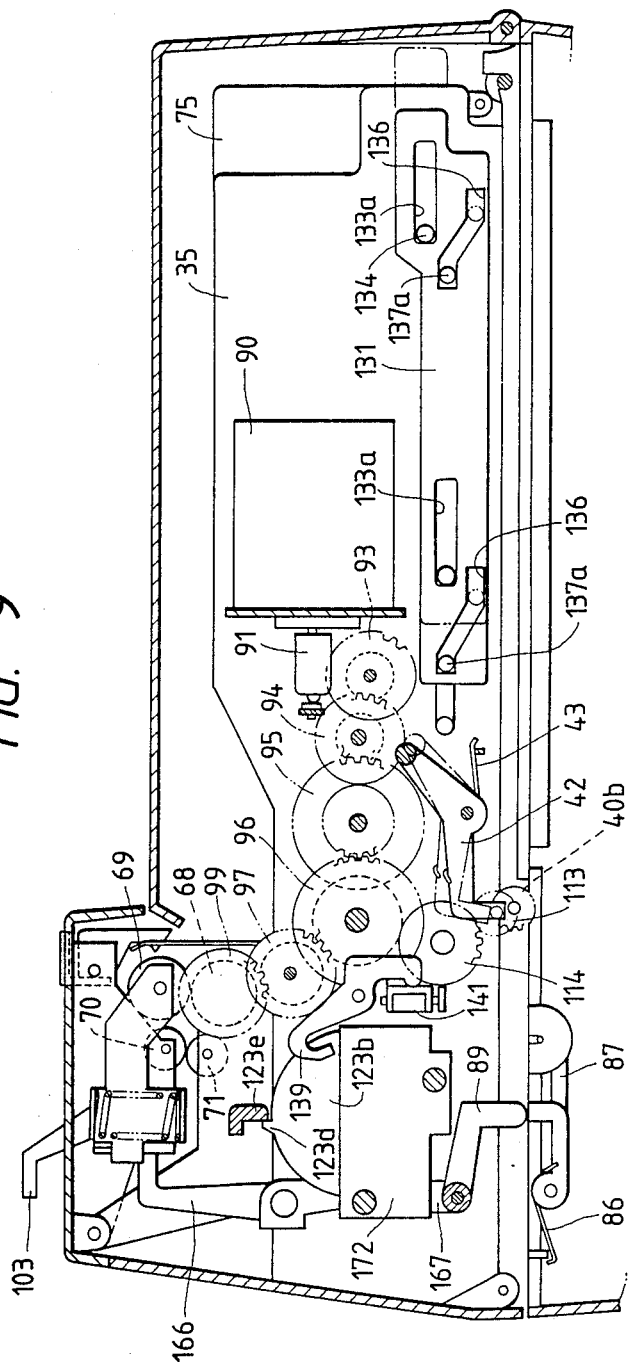
FIG. 9 is a cross-sectional view taken along line IX—IX of FIG. 6.
Figure 10:
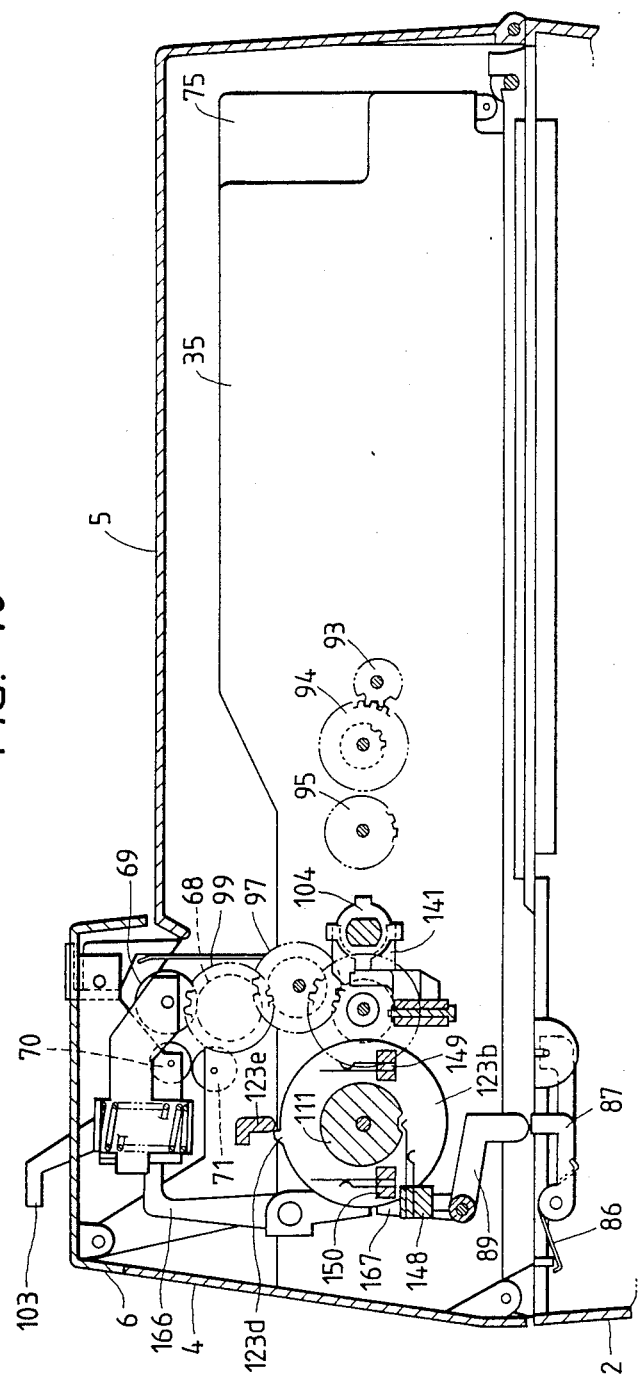
FIG. 10 is a cross-sectional view taken along line X—X of FIG. 6.

The driver unit G is operably interconnected to the thermal fixing unit D as follows;

As shown in FIGS. 6, 9, and 10, the driver unit G includes a drive motor 90 having a drive shaft on which a worm 91 is mounted. The worm 91 has its distal end held against a thrust bearing member 91t and is held in mesh with a helical gear 93 (FIGS. 9 and 10) that is operatively coupled through successive driven gears 94, 95, 96 to a thermal fixing unit driver gear 97. The thermal fixing unit driver gear 97 is held in mesh with a driven gear 99 mounted on an end of the shaft of the thermal fixing roller 68. As shown in FIG. 8, The shaft of the thermal fixing roller 69 supports on one end thereof a gear meshing through an idle gear 100 with a feed roller driver gear 101 mounted on one end of the feed roller 70. The thermal fixing roller 69 and the feed roller 70 are normally pressed against the thermal fixing roller 68 and the feed roller 71, respectively, under the resilient force of a pressing spring 102, which can be adjusted by a lamination switching lever 103 (described later in detail with reference to FIG. 6).

Figure 11:
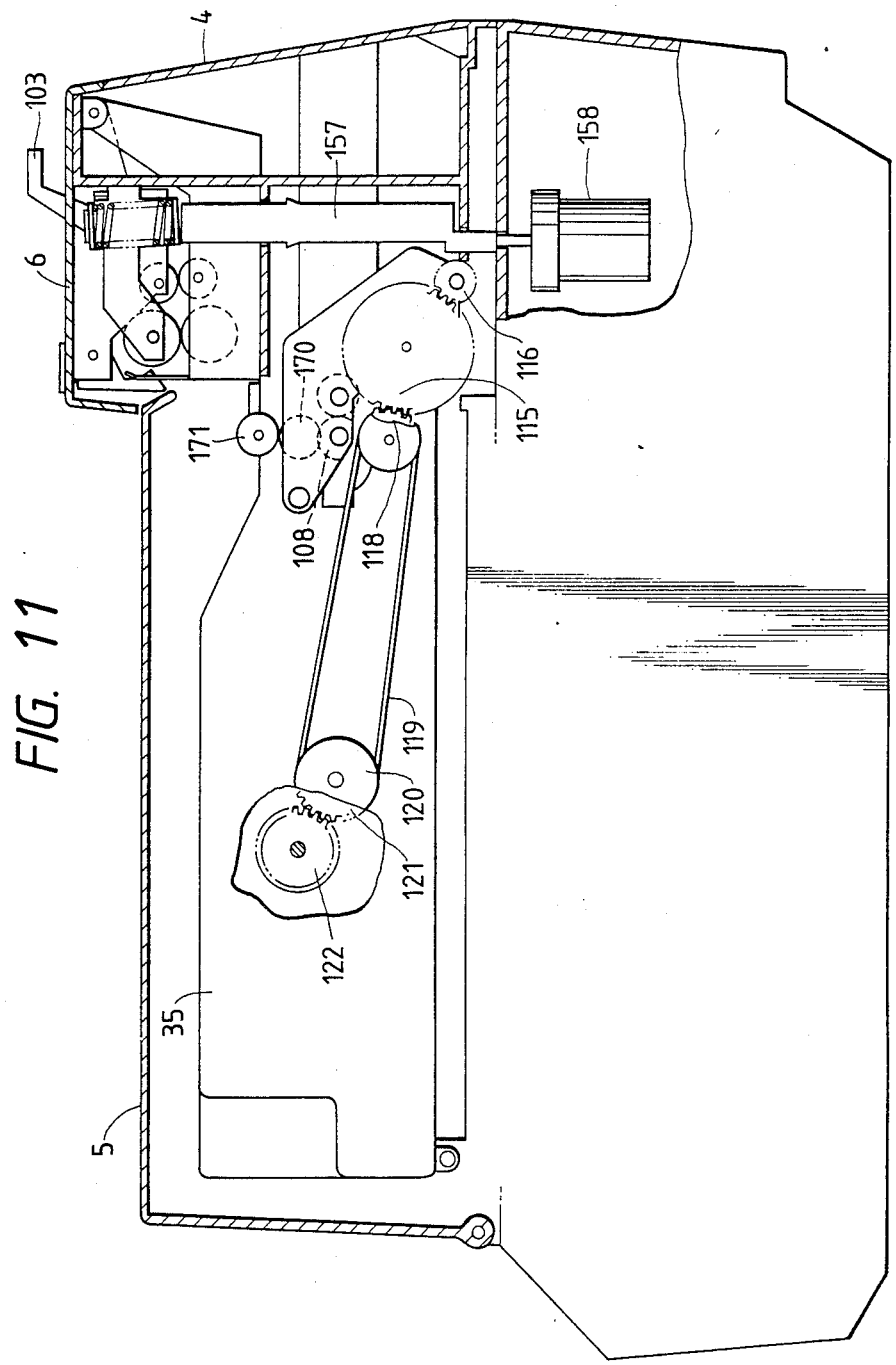
FIG. 11 is a cross-sectional view taken along line XI—XI of FIG. 6.

Mechanical interlinkage of the driver unit G with respect to the pressure developing unit C, the sheet storage cartridge unit E and the developer sheet insertion unit F will next be described. As shown in FIG. 6, on the shaft of the driven gear 96, there is mounted a clutch disc 104 that is engageable with and disengageable from the driven gear 96 through a clutch spring 105. A coupler gear 106 mounted on the shaft of the driven gear 96 is coupled through a coupler 107 to a driver gear 108 (FIG. 11) on the pressure developing roller 60. The coupler gear 106 is held in mesh with the cam roller 66 through an idle gear 109 and a cam gear 110 (FIG. 5). As shown in FIG. 11, the driven gear 108 connected to the roller 61 is held in mesh through an idle gear 170 with a roll gear 171 on the sheet feed roller 78.

In FIG. 9, the driven gear 96 meshes with a load idle gear 114, and a load gear 113 mounted on the load roller 40b at the outlet of the exposure unit B can be moved into mesh with the load idle gear 114 by the sheet feed lever 42.

In FIGS. 6 and 11, the rotative power from the driven gear 108 is transmitted through a pulley gear 118, a supply idle gear 115, and a supply gear 116 to the developer sheet feed roller 84. Further, the rotative power from the pulley gear 118 is also transmitted through a belt 119 to a core pulley 120 and then from a core gear 121 on the shaft of the core pulley 120 to a flange gear 122 fixed to an end of the shaft of the takeup roller 77 in the sheet storage cassette 75. The pulley coupled to the pulley gear 118 and the core pulley 120 have diameters selected such that the rate at which the sheet 74 is wound on the takeup roller 77 is greater than the rate at which the sheet 74 is fed by the sheet feed roller 78.

Next, mechanical interlinkage of the driver unit G with respect to the exposure unit B and the developer sheet insertion unit F will be described. The frame 35 includes a frame portion 35a (FIG. 8) on which a substantially disc-shaped rotatable cam plate 123 is mounted on its front surface by a shaft. The cam plate 123 has three recesses 124a, 124b, 124c defined in the peripheral edge thereof. A lever stopper 125 which is selectively engageable in the recesses 124a, 124b, 124c is pivotally supported on the frame portion 35a. The lever stopper 125 is normarlly urged toward the peripheral surface of the cam plate 123 by a spring 126. Under normal condition, the lever stopper 125 engages in the recess 124b. A boss 127 projects on the front surface of the cam plate 123, and an end of an operating arm 128 mounted on the frame portion 35a is disengageably held in engagement with the boss 127. To the other end of the operating arm 128, there is coupled a front end of an elongate operating plate 129 by a pin 130. An operating lever 131 is connected to the opposite rear end of the operating plate 129 by a screw 132. The operating lever 131 has two slots 133a, 133b defined longitudinally therein and in which pins 134 projecting from the frame portion 35a are loosely inserted therein, respectively. The operating lever 131 is supported horizontally and is normally urged to the left in FIG. 8 by a spring 135. The operating lever 131 also has two cam follower slots 136 defined in its front and rear end portions thereof and inclined downwardly to the right in FIG. 8. Engaging pins 137a on the ends of the swing rods 37 (FIG. 4) mounted on the shafts 36 are loosely inserted in the cam follower slots 137. Another boss 138 (FIG. 9) also projects from the rear surface of the cam plate 123. A clutch lever 139 (FIG. 9) mounted on the rear surface of the frame portion 35a has one end positioned so as to be engageable with the boss 138 and the other end acting on a horizontally rotatable operating lever 141 (FIGS. 6, 9, and 10) to cause the clutch disc 104 to engage the driven gear 96 against the resiliency of the clutch disc spring 105.

As illustrated in FIG. 8, a release lever 142 pivotally mounted on the frame portion 35a supports on its distal end a release roller 143 pressed against the peripheral edge of the cam plate 123 by a release spring 144. The release arm 89 interlinked with the sheet feed roller 84 is operatively coupled by a clutch mechanism to the shaft on which the release lever 142 is mounted. The cam plate 123 has a projection 145 on its peripheral edge for engaging the release roller 143 to push back the release lever 142 (counterclockwise in FIG. 8).

As shown in FIGS. 6 and 10, a cam revolution detector switch 148 which is turned on when the cam roller 66 makes one revolution, a re-exposure on/off switch 149 for turning on and off the exposure slit lamp tube 47, and a switch 150 for turning on and off the halogen lamp 9 are mounted on a circuit board 172. A cam plate 123b and a cam 111 are mounted on an end of the shaft of the cam roller 66. In FIGS. 9 and 10, the cam plate 123b has on its peripheral edge a projection 123d with which is engageable a stop lever 123e integrally formed with the lever stopper 125. The cam 111 is positioned in engagement with the cam revolution detector switch 148. As shown in FIG. 6, an operating lever 152 for operating the cam plate 123 is mounted on the end of the shaft of the cam plate 123 which projects from the housing 1.

Other accessory devices of the image recording apparatus will be described below.

When the upper cover 6 is opened, the switch lever 157 (FIG. 11) is moved upwardly, so that the switch 58 is shut-off. The switch lever 157 also shuts off the switch 158 when the front cover 4 is opened together with the frame 35. As shown in FIGS. 4 and 5, a transformer 159 is disposed in the casing 2 behind the light diffusion plate 14. In FIGS. 8 through 10, the lamination switch lever 103 is angularly movably mounted in the front cover 4, and a lamination lever 166 is also disposed in the front cover 4 in contact with one end of the lamination switching lever 103. A release sublever 167 is positioned beneath the lower end of the lamination lever 166 and held in engagement with the release arm 89. The front cover 4 has a film insertion slot 162 (FIG. 4) for inserting a film to be laminated therethrough. The rear cover 5 has a film guide passage 163 defined in its upper panel and extending through the film insertion slot 162 toward the thermal fixing rollers 68, 69.

Operation of the image recording apparatus is as follows: When the power supply of the image recording apparatus is switched on, the motor 90 (FIG. 6) is rotated at a speed lower than that for a pressure fixing mode of operation, and the heater 72 in the thermal fixing roller 68 is energized. It is assumed here that, at first, the operating lever 152 is in a neutral position and the lamination switching lever 103 is in a thermal fixing position. Rotative drive power from the motor 90 is transmitted through the gears 94 through 101 to the thermal fixing rollers 68, 69 and the feed rollers 70, 71 to rotate them. When the heater 72 reaches a preset temperature, a ready lamp is energized. Then, or before the ready lamp is energized, an original is set on the original table and inserted into the housing 1, and the filter case 12 with the color filter 159 mounted therein is inserted into the filter box 11. A pin 26 projecting downwardly from the bottom of the filter case 12 engages the operating plate 18 (FIG. 5) to rotate the gear 20 for thereby retracting the rack bar 21. Therefore, the gear 25 is rotated to turn the shutter plate 15 in the direction of the arrow a in FIG. 4, thus opening the front side of the filter box 11. Thereafter, the operating lever 152 is turned counterclockwise in the direction of the arrow b in FIG. 8 for an exposure mode until the lever stopper 125 fits in the recess 124c in the cam plate 128. The operating arm 128 is turned by the boss 127 to move the operating lever plate 131 forwardly for lowering the presser plate 31 to bring the photosensitive pressure-sensitive sheet 74 into intimate contact with the original on the transparent support body 29. At this time, the photosensitive pressure-sensitive sheet 74 is not frictionally abraded by the rubber pressure plate 34 since the presser plate 31 moves in an arcuate path. By further turning the operating lever 152 in the direction of the arrow b, the boss 138 on the cam plate 123 pushes the switch 150 (FIG. 10) for energizing the halogen lamp 9. Light emitted from the halogen lamp 9 passes through the color filter 169, is diffused by the light diffusion plate 14, and then applied through the transparent support body 29 to the original. The light which has passed through the original illuminates the photosensitive pressure-sensitive sheet 74. For making an exposure twice, the operating lever 152 is returned to the neutral position, the original table is replaced with another original table, and the operating lever 152 is turned for the exposure mode.

After the exposure, a developer sheet 81 (FIG. 12) is inserted through the insertion slot 79 along the guide plate 80 until it engages and is stopped by the stopper 82. After the developer sheet 81 has been inserted, the operating lever 152 is turned clockwise in the direction opposite to the direction b (FIG. 8) until the lever stopper 125 fits into the recess 124a in the cam plate 123. The clutch lever 139 is then turned by engagement with the boss 138 to rotate the operating lever 141 horizontally, whereupon the clutch disc 104 is coupled to the driven gear 96 to transmit the rotative power of the motor 90 to the pressure developing rollers 60, 61. At the same time, the release lever 142 is retracted by being pushed by the projection 145 on the cam plate 123. The release arm 89 is now turned upwardly to allow the sheet feed roller 84 to be elevated from the position of FIG. 12 for thereby releasing the leading end of the developer sheet 81 from the stopper 82. The developer sheet 81 is gripped between the pinch roller 85 and the sheet feed roller 84, and the sheet feed roller 84 is driven by the motor power transmitted through the driven gear 96, the coupler gear 106, the supply idle gear 115, and the supply gear 116 to deliver the developer sheet 81 between the pressure developing rollers 60, 61. The developer sheet 81 first advances until its leading end abuts the photosensitive pressure-sensitive sheet 74, and is then moved along the sheet 74 into the pressure developing unit C. At this time, the photosensitive pressure-sensitive sheet 74 is also fed by the sheet feed roller 78 driven by the driven gear 108, the idle gear 170, and the roll gear 171 and is wound on the takeup roller 77 in synchronism with the delivery of the developer sheet 81.

The cam plate 123b is also rotated by the gears 106, 109 and 110 to turn on the switch 149 for thereby energizing the exposure slit lamp tube 47. At the same time, the cam roller 66 is caused by the gears 106, 109, 110 to make one revolution to enable the pressure developing roller 60 to press the photosensitive pressure-sensitive sheet 74 against the pressure developing roller 61 with the developer sheet 81 overlapping the exposed surface of the sheet 74. Therefore, the sheets 74, 81 as they are superposed on each other are passed between and pressed together by the pressure developing rollers 60 and 61. Those microcapsules which are not photo-cured on the exposed surface of the sheet 74 are ruptured under pressure to release the dye precursor which reacts with the color developers on the developer sheet 81, thereby developing an image on the sheet 81. After the image has been developed under pressure, the developer sheet 81 is fed between the thermal fixing rollers 68 and 69. The photosensitive pressure-sensitive sheet 74 as it leaves the pressure developing unit C is fed by the sheet feed roller 78 and wound by the takeup roller 77. At this time, the photosensitive pressure-sensitive sheet 74 is prevented from being slackened since the diameter of the pulley of the pulley gear 118 (FIG. 6) and the diameter of the core pulley 120 (FIG. 6) are selected such that the takeup roller 77 winds the sheet 74 at a rate greater than the rate at which the sheet 74 is fed by the sheet feed roller 78. One cycle of the above pressure developing process is in synchronism with one revolution of the cam rollower 66. Therefore, one pressure developing cycle is finished when the rollers 65 enter the cam slots 67. At the same time that the pressure developing cycle is completed, the stop lever 123e is lifted by the projection 123d on the cam plate 123b to elevate the lever stopper 125, whereupon the cam plate 123 is returned to the neutral position. Concurrent with this, the clutch disc 104 is disconnected from the driven gear 96. The switch 148 (FIG. 10) is turned off as it engages in a cam recess in the cam 111. When the switch 148 is turned off, the voltage applied to the motor 90 is lowered to increase the service life of the motor 90.

The developer sheet 81 which has entered the thermal fixing unit D is heated by and between the thermal fixing rollers 68, 69 for color development. The temperature of the developer sheet 81 is then lowered while the sheet 81 is being pulled by the feed rollers 70, 71 and straightened thereby so that the sheet 81 will not be curled. Then, the sheet 81 is discharged from an outlet slot 164 defined between the front cover 4 and the upper cover 6.

For laminating the developer sheet 81 with a transparent film, the lamination switching lever 103 (FIGS. 8 and 9) is turned to turn the lamination lever 166 to thereby lower the release arm 89 and the sheet feed roller 84. The developer sheet 81 therefore cannot be fed into the housing 1 from the insertion slot 79. When the lamination switching lever 103 is turned, the pressing spring 102 is compressed to press the thermal fixing roller 69 more strongly against the thermal fixing roller 68. Then, an image, particularly one on a developer sheet 81 or any other picture, is sandwiched between lamination sheets, and inserted between the thermal fixing rollers 68, 69 by which the sheets are fused with heat. If the developer sheet 81 or the like is jammed in the thermal fixing unit D, then the upper cover 6 is opened, and the thermal fixing roller 69 and the feed roller 70 are lifted to remove the jammed sheet. In this instance, gears 99 and 97 are slippingly rotated so as to prevent the motor 90 from application of overloading.

In case of the removal of the filter case 12 for exchanging the color filters 169, the engaging pin 26 rotates the shutter opening and closing gear 20 (FIG. 2), so that the shutter plate 15 is closed for light shielding. As a result, light does not enter the transparent original mounting member 29 (FIG. 4). Within the filter case 12, the filter is resiliently held by a filter holding spring 165 (FIG. 4). In case of the insertion of the filter case 12 into the image recording apparatus, the engaging pin 26 rotates the gear 20 to thereby open the shutter plate 15.

The photosensitive pressure sensitive sheet 74 is assembled to the image recording apparatus in the following manner. When the cassette 75 is assembled, a leading end of the photosensitive pressure sensitive sheet 74 is interposed between the load roller 40a and the guide roller 39a. In this case, the load roller 40a and the guide roller 39a providee their sheet nipping state, since the rear cover 5 is opened. When the rear cover 5 is closed, the claw member 44 (FIG. 8) urges the load roller 40a downwardly, so that the latter is moved away from the guide roller 39a. Similarly, the load roller 40b is in contact with the guide roller 39b when the rear cover 5 is opened. With nipping the leading end of the photosensitive sheet 74 between the load roller 40b and the guide roller 39b, the load idle gear 114 and the load gear 113 are brought into meshing engagement with each other by pushing down the sheet feed lever 42 (FIGS. 8 and 9), to thereby rotate the load roller 40b. Accordingly, the load roller 40a is also rotated by way of the power transmission through the load belt 46 (FIG. 7). As a result, the photosensitive pressure sensitive sheet 74 is travelled from the exposure unit B to the pressure developing unit C.

When the sheet feed lever 42 is at lower position, the load roller 40b is moved to its ascent position. Therefore, the hook portion 29a (FIG. 12) is also moved upwardly, since the hook 29a is engaged with the shaft of the load roller 40b. As a result, the outlet end portion of the original mounting table 29 is moved upwardly. This upward movement of the outlet end of the table 29 prevents the leading end of the photosensitive sheet 74 from directing into the guide frame 54, and therefore, the sheet 74 is surely assembled in the image recording apparatus. The upward position of the outlet end portion of the original mounting table is positioned at least equal to or ligher than ambiment mechanical components such as the original guide frame 54.

The leading end portion of the sheet 74 passes through a minute space provided between the pressure developing rollers 60 and 61. In this instance, the sheet feed lever 42 is released for suspending the sheet feeding. The leading end portion of the photosensitive sheet 74 passing through the pressure developing rollers is affixed to the takeup roller 77, and the rear cover 5 is closed, so that the sheet setting is completed.

In view of the foregoing, according to the second embodiment, when the photosensitive pressure sensitive sheet is assembled to the recording apparatus, the outlet end portion of the original mounting table at the light exposure zone is movable to its ascent position which is equal to or higher than the height of the ambient mechanical components. Therefore, the leading end portion of the photosensitive sheet is easily assembled without any disadvantageous guidance by the ambiment mechanical component.

Although certain preferred embodiments have been shown and described, it should be understood that many changes and modifications may be made therein without departing from the spirit and scope of the invention.

What is claimed is:

1. An exposure unit for exposing a photosensitive image recording medium with light for forming an image corresponding to an original comprising:
    a light source;
    an original mounting table for mounting said original thereon, said original mounting table being disposed above said light source and extending over a light path zone so as to maintain said original at said light path zone, said photosensitive image recording medium being conveyed over said original:
    contact means disposed above said photosensitive image recording medium for providing an intimate contact between said original and said photosensitive image recording medium when said original is brought into said light path zone for allowing light to pass through said original and to reach to said photosensitive image recording medium;
    means for guiding travel of said original;
    wherein said original mounting table is stationarily supported and wherein said means for guiding guides travel of said original, said means for guiding being disposed above said original mounting table and extending along both side edges of said original for preventing said original from engaging said photosensitive recording medium when said original is inserted onto said original mounting table.

2. The exposure unit as defined in claim 1, further comprising an original supporting member for accommodating said original therein, said original supporting member accommodating said original being slidingly movable along said original mounting table; and wherein said guide means guides travel of said original supporting member and prevents said original supporting member from engaging said photosensitive recording medium.

3. An exposure unit for exposing a photosensitive image recording medium with light for forming an image corresponding to an original comprising:
    a light source;
    an original mounting table for mounting said original thereon, said original mounting table being disposed above said light source and extending over a light path zone so as to maintain said original at said light path zone, said photosensitive image recording medium being conveyed over said original;
    contact means disposed above said photosensitive image recording medium for providing an intimate contact between said original and said photosensitive image recording medium when said original is brought into said light path zone for allowing a light to pass through said original and to reach to said photosensitive image recording medium; and
    means for guiding travel of a leading edge of said photosensitive image recording medium, said guide means comprising:
    said original mounting table movably supported and having upstream and downstream end portions with respect to the conveying direction of said photosensitive recording medium; and a drive means operably connected to said original mounting table for selectively moving said downstream end portion to a position equal to or higher than positions of ambient mechanical components in said image recording apparatus.

* * * * *